United States Patent [19]

Cook et al.

[11] Patent Number: 5,006,187
[45] Date of Patent: Apr. 9, 1991

[54] PLUGGED MICROPOROUS FILM

[75] Inventors: John A. Cook, Faringdon; Raymond W. Singleton, Cirencester, both of Great Britain

[73] Assignee: Scimat Limited, Great Britain

[21] Appl. No.: 366,360

[22] Filed: Jun. 15, 1989

Related U.S. Application Data

[63] Continuation of Ser. No. 88,623, Aug. 21, 1987, abandoned.

[30] Foreign Application Priority Data

Aug. 22, 1986 [GB] United Kingdom ............. 8620484

[51] Int. Cl.$^5$ .............. B29C 47/00; B05D 3/06; B05D 5/00; B32B 31/20
[52] U.S. Cl. ................. 156/244.11; 156/281; 156/308.2; 427/53.1; 427/54.1; 427/245; 264/22; 264/49
[58] Field of Search .............. 427/54.1, 44, 245, 53.1; 522/109, 111; 525/187; 156/244.1, 281, 308.2; 264/22, 49

[56] References Cited

U.S. PATENT DOCUMENTS

| | | | |
|---|---|---|---|
| 3,425,981 | 2/1969 | Puletti et al. | 525/187 |
| 3,576,686 | 4/1971 | Schmidle et al. | 156/77 |
| 3,673,127 | 6/1972 | Weininger et al. | 260/2.5 |
| 3,709,752 | 1/1973 | Wistozky et al. | 156/79 |
| 3,770,537 | 11/1973 | Elton | 157/77 |
| 3,837,500 | 9/1974 | Nicolas et al. | 210/490 |
| 3,953,566 | 4/1976 | Gore | 264/288 |
| 3,993,551 | 11/1976 | Assarsson et al. | 522/111 |
| 4,100,238 | 7/1978 | Shinomora | 521/61 |
| 4,230,463 | 10/1980 | Henis et al. | 55/16 |
| 4,239,714 | 12/1980 | Sparks et al. | 264/45.5 |
| 4,283,457 | 8/1981 | Kolsky et al. | 428/285 |
| 4,302,496 | 11/1981 | Donovan | 428/196 |
| 4,381,320 | 4/1983 | Nguyen | 522/109 |
| 4,613,544 | 9/1986 | Burleigh | 427/245 |
| 4,636,424 | 1/1987 | Amemiya et al. | 428/198 |
| 4,775,474 | 10/1988 | Chau et al. | 264/22 |
| 4,863,792 | 9/1989 | Mrozinski | 156/308.2 |

FOREIGN PATENT DOCUMENTS

| | | |
|---|---|---|
| 0160473 | 11/1985 | European Pat. Off. . |
| 1018837 | 11/1957 | Fed. Rep. of Germany . |
| 2051237 | 5/1970 | Fed. Rep. of Germany . |
| 2118625 | 11/1971 | Fed. Rep. of Germany . |
| 2124798 | 3/1972 | Fed. Rep. of Germany . |
| 2339148 | 4/1975 | Fed. Rep. of Germany . |
| 1312082 | 11/1962 | France . |
| 1456693 | 9/1966 | France . |
| 2170783 | 9/1973 | France . |
| 11222804 | 8/1968 | United Kingdom . |
| 1303897 | 1/1973 | United Kingdom . |
| 1325227 | 8/1973 | United Kingdom . |
| 1415852 | 11/1975 | United Kingdom . |
| 1425318 | 2/1976 | United Kingdom . |
| 1481228 | 7/1977 | United Kingdom . |
| 1493654 | 11/1977 | United Kingdom . |
| 1538810 | 1/1979 | United Kingdom . |
| 2024100 | 1/1980 | United Kingdom . |

Primary Examiner—Norman Morgenstern
Assistant Examiner—Marianne L. Padgett
Attorney, Agent, or Firm—Lerner, David, Littenberg, Krumholz & Mentlik

[57] ABSTRACT

A method of making a plugged microporous film from a film which comprises a structural component having pores extending therethrough, and a plugging material within the pores, the method comprising:

(a) selectively treating the plugging material so that its susceptibility to a crosslinking treatment differs from a first region of the film to a second region thereof;

(b) crosslinking the plugging material at the second region of the film; and (c) removing the uncrosslinked plugging material from the first region of the film leaving plugs of crosslinked plugging material in the pores at the second region of the film.

17 Claims, 5 Drawing Sheets

Fig.3a.

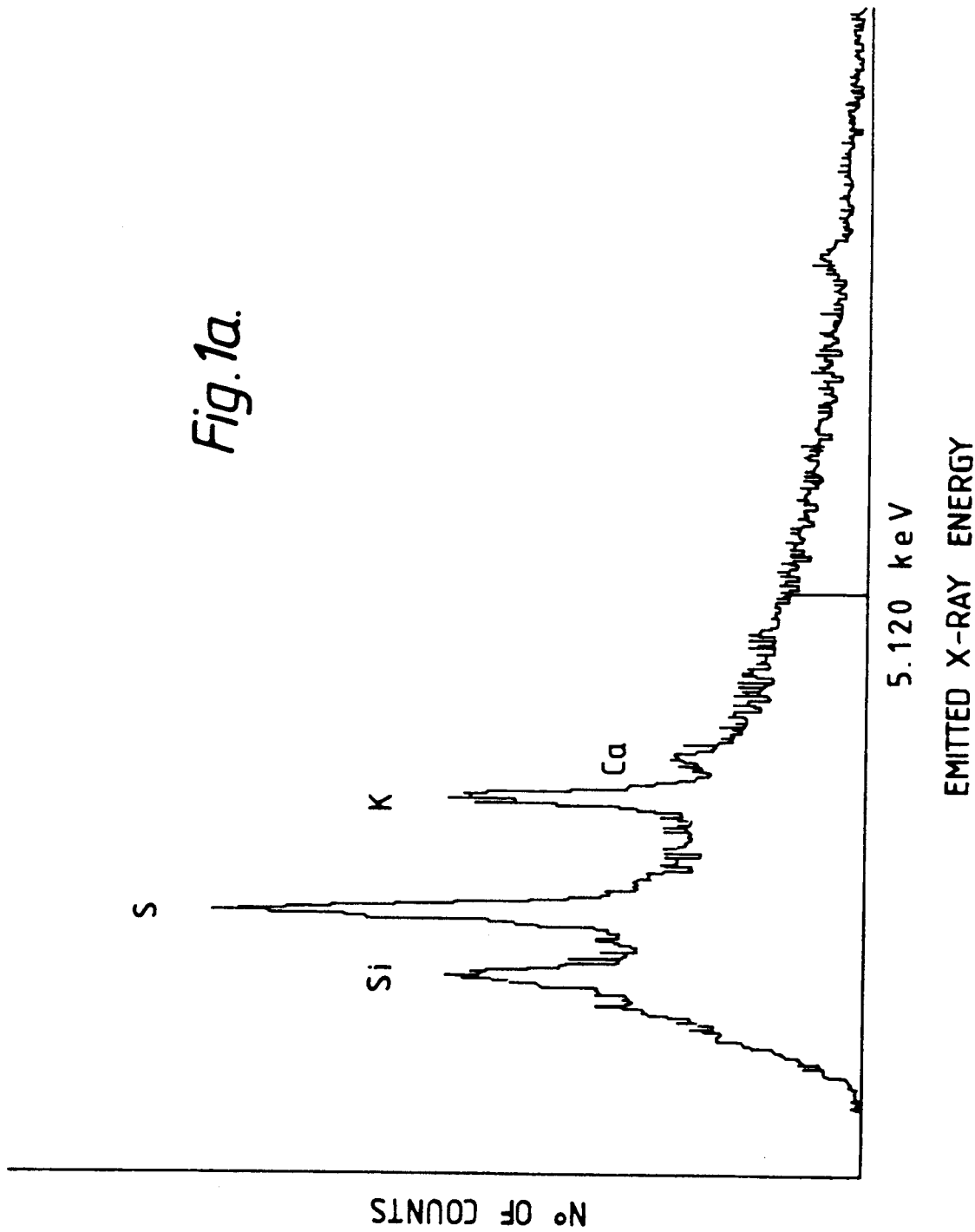

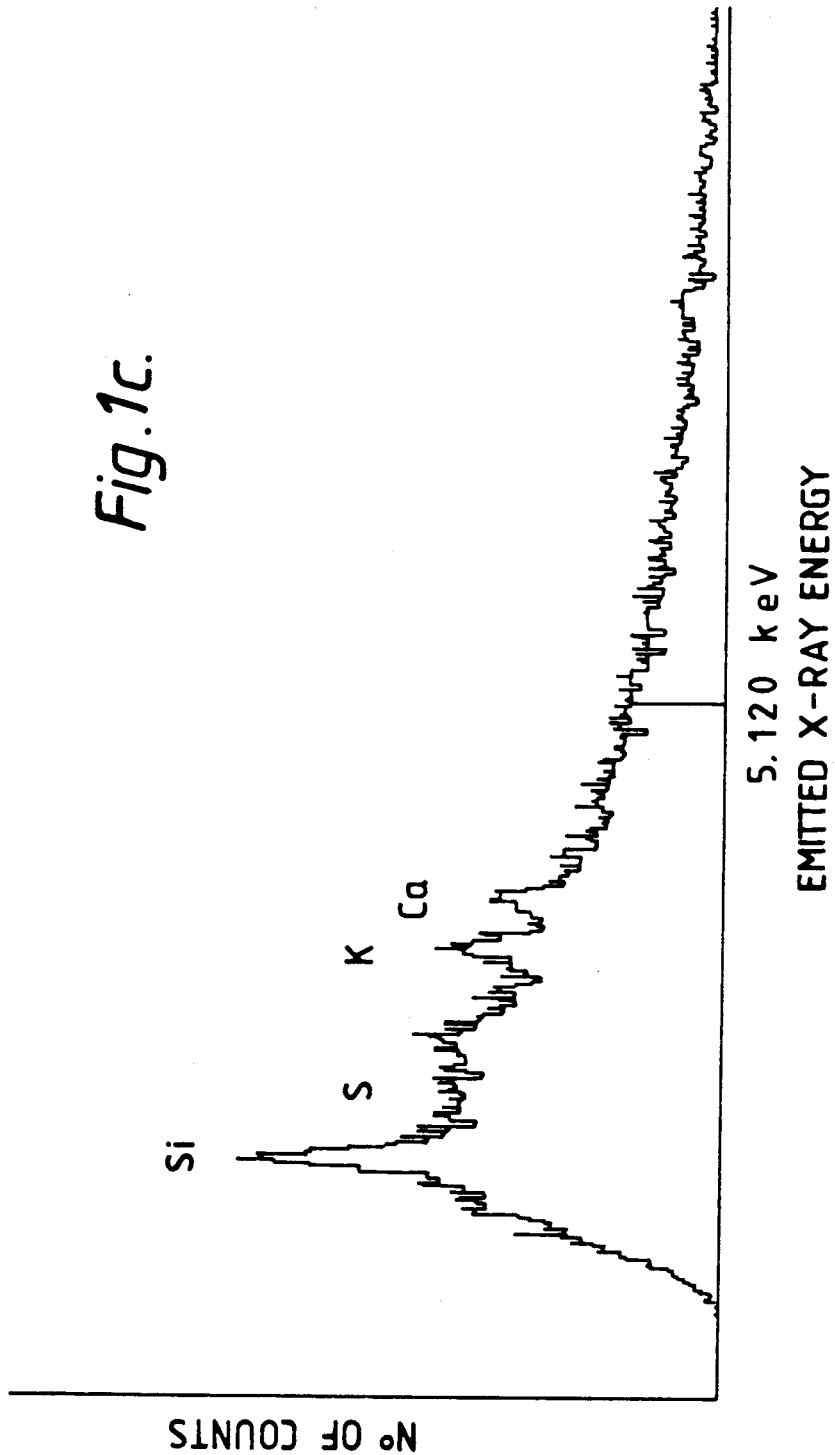

10μM

10μM

PLUGGED MICROPOROUS FILM

This application is a continuation application of application Ser. No. 07/088,623, filed Aug. 21, 1987, now abandoned.

BACKGROUND OF THE INVENTION

This invention relates to a method of making a plugged microporous film.

The term "film" is used to denote sheets of a material with a thickness of less than 2.0 mm. The film of the invention has pores which extend therethrough, that is to say, which extend from one surface of the film to the other surface for the transmission of fluids through the film, at least some of the pores containing plugging material capable of acting as a barrier to transmission of certain fluids through the pores. The pores are microscopic, that is to say, the details of their structure are discernable only by microscopic examination. Preferably the structure of the pores is so fine that discernment thereof is possible only by use of electron microscopy techniques, which can resolve details of structure below 500 nm.

Microporous films are used in a variety of applications to provide selective barriers, allowing the passage of a first material while acting as a barrier to passage of a second material. For example, such films are commonly used as gas separation membranes, reverse osmosis membranes, packaging material especially for sterilised medical equipment and as barriers to bacteria. The films may be used as filtering membranes, for example to separate solid materials from gases and liquids. Furthermore, microporous films may be used as semipermeable membranes for separating wetting fluids from non-wetting fluids; for example, a gas-saturated membrane in contact with a liquid and a gas will transmit the gas (the wetting phase) but it will not transmit the liquid (the non-wetting phase) provided that the pressure in the liquid does not exceed the liquid entry pressure for the particular combination of membrane and fluids. An application of microporous films which makes use of these semi-permeable membrane properties is to confer waterproof properties on a fabric, while allowing the fabric to breathe. When the fabric is incorporated into an article such as a garment, tent or other protective article, the article is resistant to transmission of liquid water while allowing transmission of water vapour, thereby minimising the formation of condensation on the inside of such an article.

The transmission properties of microporous films are determined principally by the material and the thickness of the film and the structure of the pores (including the dimensions and tortuosity). However, the properties of the films may be modified by the presence of a layer of another material through which any fluid passing through the pores in the film has to pass. This layer of other material can be considered as providing an additional filter. For example, there is disclosed in GB-A-2024100 a flexible layered article for use in waterproof garments which permits transmission of water vapour but is resistant to the transmission of liquid water. The article comprises a layer of porous hydrophobic material and a continuous hydrophilic layer which is attached to a face of the layer of hydrophobic material. The hydrophilic layer forms a barrier to surface tension lowering agents (such as certain constituents of perspiration) which would, if present in the layer of hydrophobic material, tend to reduce the waterproofness of that layer.

GB-1493654 discloses a process for the production of a semi-permeable membrane in which a blend of water-soluble and water-insoluble polymers is formed into a film, and a surface layer of the water-soluble polymer is crosslinked, thereby rendering that layer insoluble. The remaining soluble polymer is removed by washing with water. The resulting article consists of a semi-permeable membrane of crosslinked water-soluble polymer that has been formed integrally with a support provided by the water-insoluble polymer. In order to ensure that only a thin surface layer of the water-soluble polymer is crosslinked, crosslinking is effected by contact with a plasma. This involves maintaining the membrane in a low pressure atmosphere of a gas such as nitrogen or hydrogen for a period of 1 to 180 minutes, with an exposure of around 60 minutes often being necessary for a satisfactory crosslink density.

SUMMARY OF THE INVENTION

The present invention provides a method of making a plugged film from a film which comprises a structural component having pores extending therethrough, and a plugging material within the pores, the method comprising:
(a) selectively modifying the plugging material so that its susceptibility to a crosslinking treatment differs from a first region of the film to a second region thereof;
(b) crosslinking the plugging material at the second region of the film; and
(c) removing the uncrosslinked plugging material from the first region of the film leaving plugs of crosslinked plugging material in the pores at the second region of the film.

DETAILS OF THE INVENTION

The method of the invention has the advantage that selection of the region that is crosslinked is not dependent only on the means for effecting the crosslinking step itself. This allows crosslinking techniques to be used which could not be used in the method known from the prior art because of their low specificity. In particular, the present method allows crosslinking techniques to be used which operate quickly and therefore allow continuous processing, and which do not require complicated and expensive equipment. Furthermore, the method has the advantage of being extremely versatile, allowing the depth of the plugs in the finished film to be varied by changing the conditions under which the plugging material is modified and crosslinked, as described in more detail below. Moreover, the method of the invention is capable of being used to make films with a wider range of configurations than is possible using techniques in which it is necessary to maintain a film in a low pressure inert atmosphere. In particular the method can be used to make relatively large films and, when the films are made continuously, to make wide films.

The method of the invention has the further advantage that the end product does not suffer from delamination as is the case in articles consisting of layers, of which one is attached to a face of the other.

The method of the invention allows particular transmission properties of the film to be obtained by appropriate selection of the step of modifying the plugging material, in particular by selection of the configuration and relative dimensions of the first and second regions of the film. Depending on the application to which the film is to be put, the first and second regions may be in the form of laminae, i.e. laminate regions. By use of particular modification steps, films can be made in which there is no discernable boundary between first and second laminate regions. In such films, the exterior faces of the two regions will generally have different properties and/or compositions, but there will be a gradual change in properties and/or composition, across the whole or a part of the thickness of the film. In such films it will not be possible to discern the face of one region with which the other region is in contact, and it will be understood that the term "laminate regions" is used herein for convenience to denote films in which the boundary between layer-like regions thereof may or may not be discernable. The method of the invention can therefore be used to produce films in which plugging material is disposed at the mouth of the pores of the structural component. It will be understood however that in many microporous films, it might not be possible to discern individual pores, the structure of the film being more like that of an open-cell foam. In such cases, plugs of the plugging material may be interconnected so that effectively the plugging material impregnates the structural component in a skin-like surface region thereof.

The method of the invention may also be used to make films of which the first and second regions occupy different areas, that is to say they may be side-by-side regions. The region of the film may have combination of the two configurations.

The method can thus be used to make films in which the transmission properties towards fluids differ from one area of the film to another.

There may be a plurality of first regions, second regions or both in the film.

Particularly, when the first and second regions of the film are side-by-side regions, it is envisaged that different plugging materials may be employed at different second regions.

For many applications, it will be preferred that the first and second regions of the film will be laminate regions, so that effectively, the plugs extend only part way through the pores of the finished film. For ease of manufacture and to allow the transmission properties of the film to be controlled accurately, it is preferred that the second region of the film is a laminate region at or towards a surface of the film, so that plugs are provided at an end of at least some, and preferably each, of the pores. The depth of the plugs in the pores can affect their filtration efficiency. The depth of the plugs will be selected according to the desired properties of the finished film by modifying the plugging material appropriately, this versatility being an advantage of the method of this invention. By varying the thickness of the plugs across the surface of the film, the transmission properties of the film may be arranged to vary across the surface of the film, from one area to another.

The plugs in the finished microporous film are chosen to be substantially inert towards materials, especially fluids, with which the film will come into contact when in use, although beneficial interactions between the plugs and the fluids are not excluded. In some embodiments, the plugging material may be inert as aforesaid prior to the step of modifying the material. Alternatively, the plugging material at the second region of the film may be rendered inert so that it can function as a plug as a result of the modification and crosslinking steps of the method. In the latter case, the plugging material will generally be incapable of providing plugs in the pores prior to the modification step.

Prior to the removal treatment, the plugging material within the pores of the structural component may extend through the whole of the thickness of the structural component or through just a part thereof. Preferably, the plugging material extends through the whole of the thickness of the structural component so that it substantially fills the pores. A film which comprises plugging material substantially filling the pores in a structural component may be prepared from a blend of the plugging material and the material of the structural component, for example by casting or by a melt-processing technique such as extrusion. When the plugging material does not fill the pores in the structural component, it will have to be present at least in that part of the pore in which it is desired to form the plug.

The structural component provides a microporous matrix in the finished film. The structural component may be formed as a separate entity prior to the introduction of plugging material into its pores and the operation of the steps of the present method. For example, the structural component may be formed by altering the composition of a film, for example by removal of a component therefrom, or it may be formed by a physical treatment such as stretching or perforation. Preferably however, when the pores of the structural component are formed, they contain the plugging material, which, in effect, defines the pores. This may be achieved by forming the film from a blend of the material of the structural component and of the plugging material, for example as described above. This is a preferred method for forming a preferred film, in which the material of the structural component is exposed on the plugged surface thereof, between the pores.

For applications in which the film is required to provide a semi-permeable membrane, for example for separating fluids, the material of the structural component will preferably be selected to be unwettable, that is to have a fluid contact angle of more than 90 degrees by at least one of the fluids, and wettable by at least one other of the fluids. For example, a film which is required to allow passage of water vapour but to act as a barrier to passage of liquid water will comprise a structural component, the material of which is hydrophobic. By the term "hydrophobic", as applied to the material of the structural component, is meant that the material is unwettable, having a water contact angle of more than 90 degrees, and such that water will not spread on the material or wick into porous structure. Polymeric materials are preferred for the structural component, particularly when it is hydrophobic, since they can conveniently be formed into a microporous film, but where desired, it is envisaged that other materials, such as metallic or inorganic materials, may be used.

Preferred hydrophobic materials which may be used for the structural component include:

Polymers of ethylenically unsaturated hydrocarbons having from 2 to 12 carbons such as ethylene, propylene, butadiene and 4-tert butyl styrene. Copolymers of these materials are also useful, for example ethylene-propylene rubbers; and Fluoropolymers, in particular ethylenetetrafluoroethylene copolymer (Tefzel TM) and polychlorotrifluoroethylene (Halar TM).

The removal treatment by which plugging material is removed from the first region of the film, leaving plugs of the plugging material in the pores at the second region of the film, may involve treatment of the film with a reagant, such as a solvent, or it may be independent of reagant contact, for example by heating. In either case, the treatment may involve reaction or decomposition of the plugging material. For example, the plugging material may be sufficiently volatile to be capable of vapourising or subliming at a temperature to which the structural component can be heated without degradation. The plugging material may also be removed after, or as a result of, degradation by treatment with irradiation or by ultrasonic treatment. Alternatively, the plugging material may be removed or rendered removable by reaction with one or more reactants. Preferably however, the removal treatment comprises treating the film with a solvent in which the plugging material at the first region of the film is soluble.

The precise nature of the modification to the plugging material will depend on the nature of the removal treatment to which the plugging material is subsequently to be subjected. The modification should generally be capable of being carried out on selected regions of the film, so that when the film is subjected to the removal treatment, the plugging material is removed from the (or each) first region of the film, leaving plugs of the plugging material in the pores at the (or each) second region of the film. Preferably, the modification will be a treatment administered to the film through one of its surfaces, with the depth of penetration of the treatment being carefully controlled. The plugging material may be modified at one or more regions of the film with a reagant which reacts with the plugging material so as to change its susceptibility to a removal treatment. The selective treatment to the plugging material may comprise a combination of treatment with a reagant and irradiation. An advantage of certain irradiation techniques such as UV irradiation to effect crosslinking is that crosslinking of the plugging material in the immediate vicinity of the membrane surface is inhibited, for example by oxygen quenching of radicals. This leads to the crosslinked plugging material being located primarily recessed from the surface which is irradiated.

When the first and second regions of the film are side-by-side regions, the modification may be made to selected regions of the film by careful control of the surface area of the film which is subjected to the treatment, for example by masking.

By crosslinking the plugging material at selected regions of the film, several physical properties of a plugging material may be altered, one or more of which may be relied on to provide the basis for the removal treatment. For example, the solubility of the plugging material in a solvent can be reduced by crosslinking; such modification of the plugging material, in combination with a removal treatment which comprises treating the film with a solvent in which the plugging material at the (or each) first region of the film is soluble, is a preferred embodiment of the present method.

According to the present method, the modification to the plugging material may comprise treating the plugging material at the second region of the film with a composition which renders the plugging material at that region crosslinkable, prior to subjecting the film to a crosslinking treatment. The nature of the composition with which the plugging material is treated will depend on inter alia the plugging material and the technique used to crosslink it. Preferably, the composition comprises a crosslinking agent. Alternatively however, selected regions of the film may be treated with a crosslinking inhibitor specifically to inhibit crosslinking at those regions.

Crosslinking may result directly from administration of the composition. Alternatively, crosslinking may be induced by heating or by irradiation, for example with high energy electrons or more preferably with ultraviolet (UV) radiation. UV radiation is preferred for its low capital outlay and for the speed and efficiency with which UV irradiation can be carried out. When crosslinking is effected by irradiation with ultraviolet radiation, the composition will comprise a photosensitiser, and preferably also a crosslinking agent. The use of a crosslinking agent has the advantage of ensuring additional control over the degree of crosslinking of the plugging material, and in many cases, will enable crosslinking to take place in less time than if no crosslinking agent is present. The degree of crosslinking can be affected by selecting a crosslinking agent with an appropriate power to penetrate into the pores within the structural component, with an appropriate rate of crosslinking reaction with the plugging component in view of the period of exposure to the crosslinking initiator (such as a UV lamp), and so on. An especially preferred composition comprises a solution of triallyl isocyanurate (TAIC) and benzophenone in a solvent such as toluene or methanol. When the first and second regions of the film are laminate regions, the treatment may be selectively controlled by controlling the depth of penetration of the composition. This may be achieved for example by selecting the concentration of the active components (for example photoinitiator) in the composition, by selecting the time for which the plugging material is subjected to the composition, or by a combination of these techniques.

The method of the invention preferably includes the step of exposing the film to radiation, for example to cause the plugging material in the pores at the second region of the film to become crosslinked. The radiation may comprise for example high energy electrons, or more preferably, ultraviolet radiation.

Crosslinking of the plugging material, as discussed above, renders the material at the (or each) first region of the film relatively removable, and the material at the (or each) second region of the film relatively unremovable. The proportion of removable and unremovable material will be selected according to the desired rate of fluid transmission through the film or through regions of the film, and therefore on the configurations and dimensions of the regions. When the plugs are required to allow passage of selected fluids through the pores by an absorption-evaporation mechanism (while acting as a barrier to other fluids), a relatively shallow plug will generally suffice. Indeed, it has been found surprisingly that the rate of transmission through a plug by such a mechanism is substantially unaffected by the depth of the plugs. However, by varying the depth of the plug, it is possible to vary the pressure required to force other fluids past the barrier presented by the plugs: a deeper plug will withstand a higher fluid entry pressure. In a preferred embodiment of film with laminate first and second regions, there is not more than 60%, preferably not more than 40%, especially from 0.5% to about 25%, by weight of the initial weight of plugging material remaining in the pores after substantially all of the relatively removable plugging material has been removed.

In some instances, it is possible that the plugging material does not plug every pore in the film entirely. A film with such a structure will function satisfactorily for many applications.

Factors relevant to the selection of the plugging material include the application to which the plugged film is to be put, other substances with which the plugged film will come into contact when in use, and the nature of the modification and the removal treatment. For example when the film is for use as a waterproofing layer in a garment, it will be important that the plugging material be a non-irritant to skin; when the film is for use in medical application, the plugging component will desirably be biologically inactive (although beneficial activity is not excluded); and when the film is for use in an electrochemical device, electrochemical inertness of the plugging material will generally be desirable.

When the plugs are required to filter solutes from a solution, allowing passage of the solvent, the material of the plugs will generally be selected to be capable of passing the solvent by an absorption-evaporation mechanism. For example, to enable an article which incorporates the film, such as a garment, to breathe (that is to allow passage of water vapour), the plugging material will be hydrophilic.

It is preferred that the plugging material is polymeric, particularly when the material of the structural component is also polymeric. Certain polymeric plugging materials can be modified conveniently by crosslinking as described above. Furthermore, when both the material of the structural component and the plugging material are polymeric, a blend thereof can conveniently be formed into a film by extrusion, although such a process can be employed to make films in which the plugging material is not polymeric.

When the removal treatment comprises treating the film with a solvent, the plugging material will generally be selected to be soluble in the solvent. Soluble polymers are preferred. When water or another aqueous based solvent is selected as the solvent (which is generally preferred for convenience), the plugging material may be selected from the following list (which is not exhaustive):
  alkylene oxide homo- and copolymers.
  vinyl alcohol homo- and copolymers.
  vinyl pyrrolidone homo- and copolymers.
  acrylic acid homo- and copolymers.
  methacrylic acid homo- and copolymers.

Certain naturally occurring polymers such as polysaccharides may also be used as the plugging material for certain applications.

Particularly preferred materials are ethylene oxide polymers, such as that sold under the Trade Mark Polyox. The use of ethylene oxide polymers as the plugging material is advantageous since they are water soluble and meltprocessable.

The film produced by the method of the invention may be used to render waterproof an article such as a fabric, a paper or similar fibrous material, or a building panel. The method may be applied advantageously to waterproof fabrics for use in garments, footwear, tents and other protective structures, in which the film is laminated with an appropriate fabric, which term includes sheets of woven or non-woven polymeric, synthetic or natural material.

When the microporous film is desired to confer waterproof properties on an article while allowing passage of water vapour, the porosity will preferably be such that the moisture vapour transmission rate of the microporous film is at least 1000 g.m.$^{-2}$.day$^{-1}$, measured using ASTM-E96-66B, modified as described below.

Approximately 80 cc of water is placed in a tapered polypropylene cup which is 11.5 cm high with a 6.5 cm diameter mouth. The material to be tested is sealed to the lip of the cup with a silicone adhesive. The cup assembly is weighed to the nearest 1/100 gram and an elastic rubber collar is placed on the cup under tension. In an environmental chamber, the assembly is suspended upside down through a circular opening in a support place, its position being adjusted by means of the rubber collar so that the mouth of the cup is aligned with the lower surface of the plate. Between this surface and the bottom of the chamber there is an approximately 10.0 cm air space across which air is caused to flow at about 200 m/min. The chamber is held at a temperature of 23° C.±1° C. and a relative humidity of 50%±2%. The sample remains in the chamber for three hours and is then removed and weighed again to within 1/100 of a gram. The moisture vapour rate is then expressed in grams of water lost per square metre of sample surface area per 24 hours.

The waterproofness of a microporous film may be measured by monitoring the pressure necessary to force water through the pores in the film, that is the water entry pressure (WEP). This may be done using the Mullin's Burst Test (Fed. Std. 191, Method 5512), which involves clamping a test sample onto the top of a container filled with water using an annular ring. Pressure in the container may be increased using a piston, and a gauge may be used to monitor the pressure. The test procedure consists of raising the pressure of water to the test level over a period of approximately 10 seconds, holding the pressure at that level for 30 seconds, and visually observing any leakage of water which may be forced through the sample. For high pressures, a metal screen may be positioned on top of the sample to prevent it from bursting. For some applications, an article which is capable of withstanding a test pressure of about 25 kN.m$^{-2}$ will be considered to be sufficiently waterproof, for example for applications where exposure to high water entry pressure is not encountered. For many applications, the ability to pass a higher test pressure will be desirable, for example about 60 kN.m$^{-2}$, preferably about 120 kN.m$^{-2}$, or more preferably about 172 kN.m$^{-2}$.

When the film is to be used to render a support member, such as a fabric, waterproof and breathable, the method of the invention preferably includes the step of laminating the film to the support member. Preferably, the lamination is carried out before the removal treatment since the film is less susceptible to damage during the lamination step when the relatively removable plugging material is still in the pores of the film. The lamination step may be carried out before or after the step of modifying the plugging material; in some circumstances, it can be advantageous to laminate the film with the support member before the modification and/or crosslinking step to eliminate disruption of the modified plugging material as a result of the lamination. A particularly preferred method of effecting the lamination comprises (a) laminating the support member with a sheet of material whose composition can be altered to render the material microporous, to cause the support member and the sheet to bond directly together, and (b) altering the composition of the material of the sheet to render the material microporous. The method advantageously enables a support member and a microporous film to be bonded directly together, that is to say independently of any adhesive which would tend to reduce the porosity of the film. This can enable a better controlled and more even porosity to be obtained in the finished laminated article. Furthermore, the absence of adhesive allows laminated articles to be made whose physical properties in extreme conditions, for example at extremes of temperature, are not limited by the properties of an adhesive layer. For example, articles made by the present method may be used at low temperatures without problems of poor flexibility caused by the low temperature characteristics of an adhesive layer.

The absence of adhesive also allows the laminated article to be used in media (such as solvents) and in contact with materials which might otherwise react with an adhesive layer, weakening the adhesive bond between the support member and the film.

Methods of making a plugged microporous film and a plugged film in accordance with the present invention will now be described, by way of example, with reference to the accompanying drawings, in which:

BRIEF DESCRIPTION OF THE DRAWINGS

Referring to the drawings, FIG. 1 shows X-ray fluorescence spectra of the surfaces of films which have been formed by:

(i) extruding a film of a blend of polyethylene and polyethylene oxide;
(ii) treating one surface of the extruded film with a solution of benzophenone and TAIC in toluene;
(iii) exposing one surface of the film to UV radiation to crosslink the polyethylene oxide in one region of the film; and
(iv) removing the non-crosslinked polyethylene oxide by leaching with water.

Figure 1B:
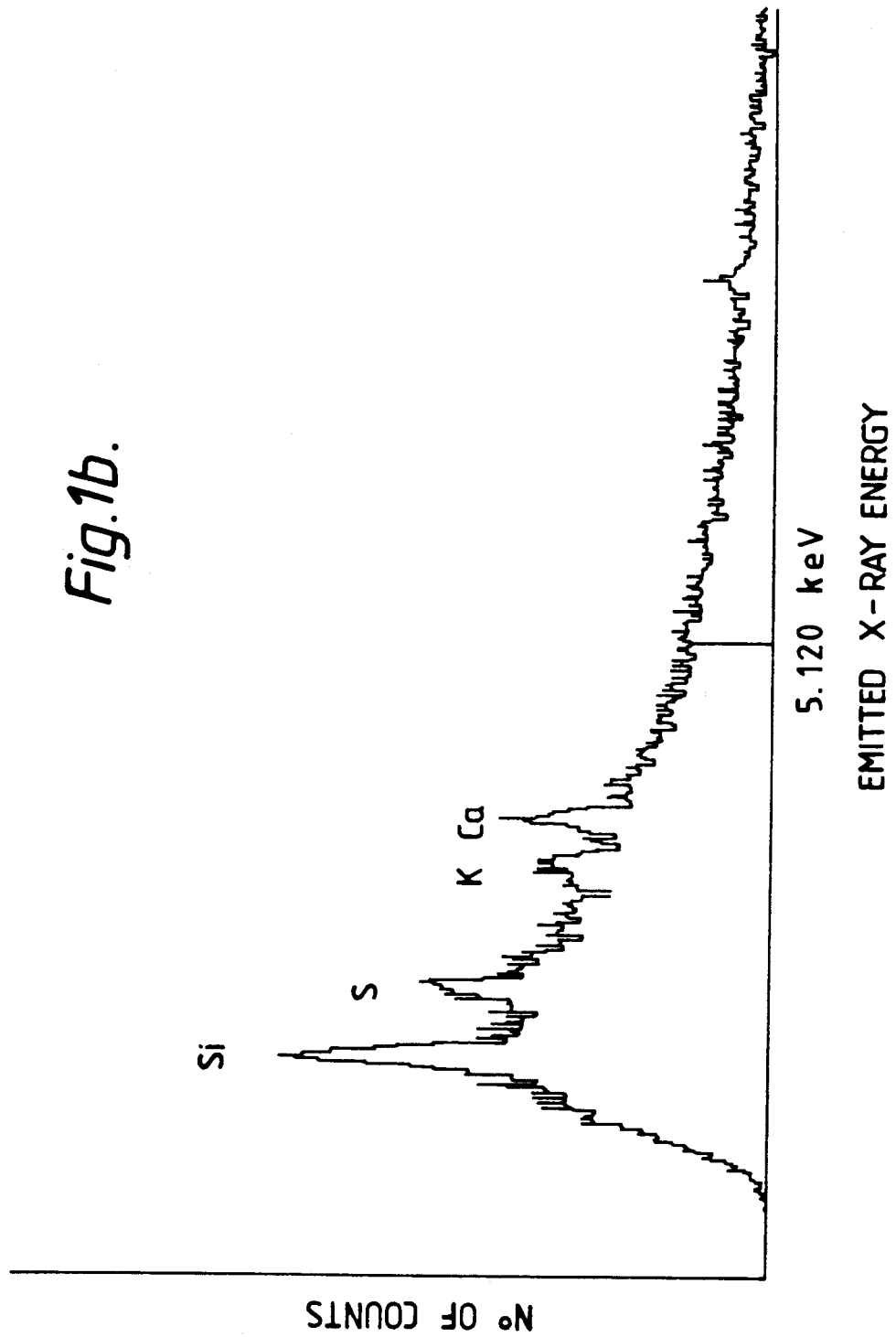
FIG. 1 shows X-ray fluorescence spectra of the surfaces of plugged microporous films.

In the film shown in FIGS. 1a and 1b, the method of preparation included the step of soaking the film in a 5% w/w solution $LiCF_3SO_3$ in acetone. FIG. 1a shows an x-ray fluorescense spectrum from the UV irradiated surface of the film. FIG. 1b is the corresponding spectrum from the unirradiated surface.

The film which is the subject of FIG. 1c was not treated with $LiCF_3SO_3$, and thus served as a control.

FIG. 1 shows clearly that the sulphur atoms remaining after the film was leached with water are located predominantly towards the film surface that had been treated with UV radiation. Since $LiCF_3SO_3$ interacts strongly with polyethylene oxide and less so with polyethylene, this indicates that the crosslinked polyethylene oxide remains in a region of the film towards the irradiated surface.

Figure 2A:
FIG. 2 shows a scanning electron micrograph and an elemental dot map of a section through a plugged microporous film.
Figure 2B:
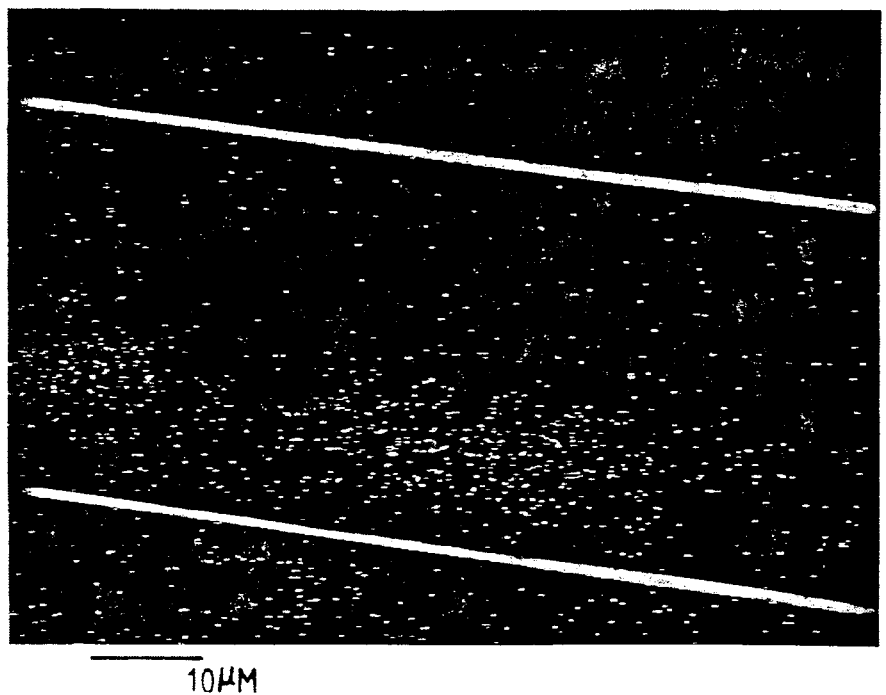

The film that had been treated with $LiCF_3SO_3$ in acetone was brittle fractured in liquid nitrogen. The scanning electron micrograph of a section through the film, which is shown as FIG. 2a, shows clearly the surfaces of the film and its microporous structure. The lower surface of the film is the one which had been irradiated with UV radiation. The elemental dot map shown as FIG. 2b was prepared by monitoring x-ray emissions from sulphur atoms in the film that is shown in FIG. 2a, and the surfaces of the film have been marked on the dot map. As can be seen from FIG. 2b, the highest concentration of sulphur atoms, which indicated the presence of the polyethylene oxide, is in a region extending parallel to the film surface which had been treated with UV radiation. Also apparent is a gradation in the concentration of polyethylene oxide through a part of the thickness of the film, and the lack of any interface between the filled and unfilled regions of the film. The concentration of crosslinked polyethylene oxide in the immediate vicinity of the treated surface is thought to be low because of quenching of free radicals by species such as oxygen during irradiation.

A small concentration of sulphur is indicated towards the film surface which has not been UV treated. It is through that this may be due to some $LiCF_3SO_3$ becoming trapped in the porous structure of the polyethylene film.

Figure 3A:
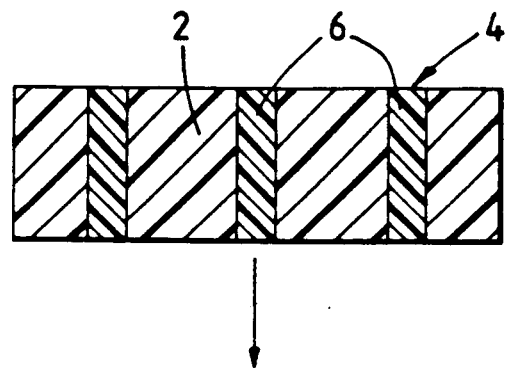
FIG. 3 illustrates schematically a method of making a film in which the first and second regions are side-by-side regions.
Figure 3B:
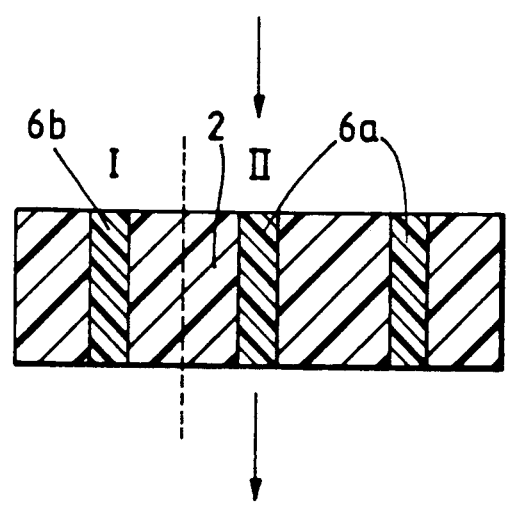
Figure 3C:
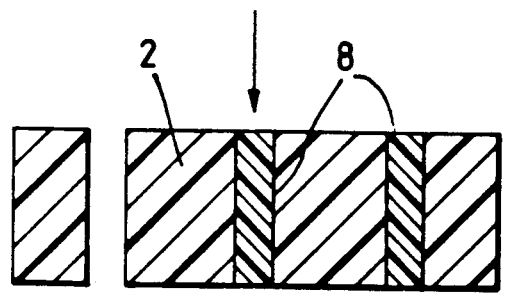

FIG. 3 illustrates a method of making a film at three stages:

(A)—before modification of the plugging material;
(B)—after modification and crosslinking of the plugging material but before its removal from the first region of the film; and
(C)—the film with plugs of the plugging material only at the second region of the film.

FIG. 3 shows a structural component 2 which provides a microporous matrix having pores 4 extending therethrough. Plugging material 6 is provided within the pores. The pores are shown schematically as extending straight through the structural component, but it will be understood that the pores will generally be tortuous. Before the modification and removal steps, the plugging material substantially fills the pores. The plugging material will preferably be provided within the pores of the structural component by extruding a blend of the structural component and the plugging material so that, as shown at stage A in the illustrated methods, the plugging material defines and fills the pores in the structural component. In a preferred embodiment, the film shown in FIG. 3 is made by extruding a blend of 40 parts w/w polyethylene and 60 parts w/w polyethylene oxide.

As a result of the modification and crosslinking steps of the present method, the susceptibility of the polyethylene oxide plugging material to a subsequent removal treatment is arranged to differ from a first region of the film to a second region thereof. Thus as shown at stage B in FIG. 3, the plugging material 6a at one region of the film is rendered relatively less susceptible to a removal treatment than the plugging material 6b at a side by side region.

The removal step of the present method involves removing the relatively removable plugging material 6b from the pores, leaving plugs 8 in the pores. When the plugging material is soluble in an aqueous solvent, the removal treatment may comprise treating the film with water or an aqueous solution.

EXAMPLES

40 Parts w/w medium density polyethylene (Sclair 8405 TM from Du Pont) and 60 parts w/w polyethylene oxide (Polyox WSRN 705 TM from Union Carbide) were compounded using a Baker Perkins twin screw extruder. The compound was then blown into a 100 micron thick film using conventional blown polymer film techniques. The die gap was 0.65 mm and the die temperature 210° C. The blow ratio was 2.1. The film was then reduced in thickness to 50 micron by passing it between 30 cm diameter rolls at a temperature of 85° C. The force exerted by the rolls on the film was 0.84 kg per linear centimetre.

The polyethylene oxide in a surface region of a film (area 8 cm × 10 cm) was crosslinked by spraying a solution of photoinitiator onto the surface of the film, and then exposing the treated surface region to ultra-violet radiation. The radiation source was a 15.4 cm 500 W medium pressure mercury vapour lamp (Hanovia Type UVS 500).

The treated films were immersed in water to extract the non-crosslinked polyethylene oxide, and the films were dried. The weight loss resulting from the extraction was measured. The moisture vapour transmission rate and water entry pressure of the finished film were measured using the methods described above.

EXAMPLE 1

Photoinitiator solution: 3.5% w/w benzophenone in methanol UV lamp to film distance: 30 cm.

TABLE 1

| UV Exposure Time (minutes) | Weight Loss on Extraction (%) | MVTR (kg.m$^{-2}$.day$^{-1}$) |
|---|---|---|
| 0 | 59.3 | 10.1 |
| 5 | 54.3 | 13.6 |
| 10 | 49.3 | 9.3 |

EXAMPLE 2

Photoinitiator solution: 3.5% w/w benzophenone in acetone
UV lamp to film distance: 30 cm.

TABLE 2

| UV Exposure Time (minutes) | Weight Loss on Extraction (%) | MVTR (kg.m$^{-2}$.day$^{-1}$) |
|---|---|---|
| 0 | 59.5 | 10.1 |
| 1 | 58.9 | — |
| 3 | 54.0 | — |
| 5 | 54.1 | 11.1 |
| 10 | 49.8 | 9.9 |

EXAMPLE 3

Photoinitiator solution: 3.5% w/w benzophenone in 1:1 propan-2-ol/water
UV lamp to film distance: 30 cm.

TABLE 3

| UV Exposure Time (minutes) | Weight Loss on Extraction (%) | MVTR (kg.m$^{-2}$.day$^{-1}$) |
|---|---|---|
| 0 | 59.3 | 10.1 |
| 5 | 57.0 | 9.7 |
| 10 | 52.1 | 11.7 |

EXAMPLE 4

Photoinitiator solution: 3.5% w/w benzophenone and 5% w/w TAIC in acetone
UV lamp to film distance: 30 cm.

TABLE 4

| UV Exposure Time (mins.) | Weight Loss on Extraction (%) | MVTR (kg.m$^{-2}$.day$^{-1}$) | Water Entry Pressure (kN m$^{-2}$) |
|---|---|---|---|
| 0 | 58.5 | 9.7 | 21 |
| 2 | 54.3 | 12.9 | 83 |

TABLE 4-continued

| UV Exposure Time (mins.) | Weight Loss on Extraction (%) | MVTR (kg.m$^{-2}$.day$^{-1}$) | Water Entry Pressure (kN m$^{-2}$) |
|---|---|---|---|
| 5 | 46.8 | 17.8 | >172 |
| 10 | 38.6 | 15.0 | >172 |

The effect of TAIC on cross-linking the polyethylene oxide can be seen by comparing this data with that in the previous examples. The effect of increasing the amount of retained polyethylene oxide on the water entry pressure is also clearly demonstrated.

EXAMPLE 5

Photoinitiator solution: 3.5% w/w benzophenone and 5% w/w TAIC in toluene.
UV lamp to film distance = 10 cm.

TABLE 5

| UV Exposure Time (mins.) | Weight Loss on Extraction (%) | MVTR (kg.m$^{-2}$.day$^{-1}$) | Water Entry Pressure (kN m$^{-2}$) |
|---|---|---|---|
| 0 | 58.2 | 10.1 | 28 |
| 0.5 | 34.6 | — | >172 |
| 1 | 27.6 | 14.5 | >172 |
| 2 | 26.8 | — | >172 |

EXAMPLE 6

Continuous lengths of film can be treated with UV radiation as follows. A polymer film, made according to the method described above, was sprayed with a solution of 3.5% w/w benzophenone and 5% w/w TAIC in toluene, immediately before passing at a rate of 0.28 m.min$^{-1}$ under the UV source described above. The distance between the film and the UV lamp was 10 cm and the exposure time of any part of the film was 38 seconds. The weight loss on extraction of noncrosslinked polyethylene oxide has been found to be 43%. The MVTR was 9.0 kg.m$^{-2}$.day$^{-1}$ and the water entry pressure was greater than 172 kN.m$^{-2}$.

EXAMPLE 7

To demonstrate the barrier properties of the film of the invention, the MVTR was measured using pure water and an aqueous solution of 0.1% w/w lithium dodecyl sulphate. The MVTR of films which had been extracted without UV treatment were also measured. The results are shown in table 6:

TABLE 6

| Sample | Test Solution | MVTR (kg m$^{-2}$ day$^{-1}$) |
|---|---|---|
| Treated | Water | 9.0 |
| Treated | Water/surfactant | 9.6 |
| Untreated | Water | 8.0 |
| Untreated | Water/Surfactant | 30.0 |

The results show that the surfactant solution causes a very large apparent increase in the MVTR for the untreated film due to the solution completely wetting out the film. In contrast, the treated film showed no signs of wetting out with the surfactant solution with the consequence that no increase in MVTR was observed.

We claim:

1. A method of making a plugged microporous film from a film which comprises a structural component having pores extending therethrough, and a plugging material within the pores, the method comprising:
   (a) selectively modifying the plugging material so that its susceptibility to a crosslinking treatment differs from a first region of the film to a second region thereof, the modification step comprising treatment of the film with a reagent;
   (b) crosslinking the plugging material at the second region of the film; and
   (c) removing the uncrosslinked plugging material from the first region of the film leaving plugs of crosslinked plugging material in the pores at the second region of the film.

2. A method as claimed in claim 1, in which the said reagent includes a composition which renders the plugging material at the second region of the film crosslinkable.

3. A method as claimed in claim 2, in which the composition comprises a crosslinking agent.

4. A method as claimed in claim 2, in which the composition comprises a photosensitiser.

5. A method as claimed in claim 1, in which the plugging material is crosslinked by exposure to radiation.

6. A method as claimed in claim 4, in which the plugging material is crosslinked by exposure to ultraviolet radiation.

7. A method as claimed in claim 1, in which at least one of the steps of modifying the plugging material and crosslinking the plugging material results in not more than 60% by weight of the initial weight of the plugging material remaining in the pores after the removal step.

8. A method as claimed in claim 1, in which the removal step comprises treating the film with a solvent in which the plugging material at the first region of the film is soluble.

9. A method as claimed in claim 1, in which the said regions of the film are laminate regions.

10. A method as claimed in claim 1, in which the said regions of the film are side-by-side regions.

11. A method as claimed in claim 1, which includes the step of forming the film by melt-processing a blend of the material of the structural component and the plugging material.

12. A method as claimed in claim 11, in which the blend comprises at least 35 parts by weight of plugging material per 65 parts of the material of the structural component.

13. A method as claimed in claim 1, which includes the step of laminating the film to a support member prior to removing the uncrosslinked plugging material from the first region of the film to cause the film and the support member to bond directly together.

14. A method as claimed in claim 13, in which the film and the support member are laminated with one another at an elevated temperature.

15. A method as claimed in claim 13, in which the support member is a fabric.

16. A method as claimed in claim 13, in which the film is laminated to the support member before the step of selectively modifying the plugging material.

17. A method as claimed in claim 11, in which the film is formed by extruding the said blend.

* * * * *